United States Patent
Browning et al.

[15] 3,638,015
[45] Jan. 25, 1972

[54] APERTURE PLATE CONTROL MECHANISM FOR ELECTRON MICROSCOPES

[72] Inventors: George William Browning; John Lewis Williams, both of Saffron Walden, England

[73] Assignee: Associated Electrical Industries Limited, London, England

[22] Filed: Mar. 31, 1970

[21] Appl. No.: 24,355

[30] Foreign Application Priority Data

Apr. 2, 1969 United Kingdom..................17,343/69

[52] U.S. Cl. ......................................250/49.5 A, 250/49.5 B
[51] Int. Cl. ............................................................H01j 37/26
[58] Field of Search....................250/49.5 A, 49.5 C, 49.5 D, 250/49.5 B

[56] References Cited

UNITED STATES PATENTS

| 3,448,262 | 6/1969 | Akahori | 250/49.5 D |
| 3,535,514 | 10/1970 | Cardile | 250/49.5 A |

Primary Examiner—James W. Lawrence
Assistant Examiner—C. E. Church
Attorney—Watts, Hoffmann, Fisher & Heinke

[57] ABSTRACT

An electron microscope comprising a microscope chamber having an aperture plate control mechanism mounted thereon and including an aperture support arm extending into the microscope chamber and mounted for movement along a longitudinal axis of said arm, and an aperture plate having at least one aperture, or passage, extending therethrough and being pivotably mounted on the support arm. First and second drive means are coupled to the support arm and the aperture plate, respectively, for varying the position of the aperture plate with respect to a beam of electrons.

12 Claims, 3 Drawing Figures

INVENTOR.
G.W. BROWNING
J.L. WILLIAMS
Watts, Hoffmann, Fisher & Heinke
ATTORNEYS

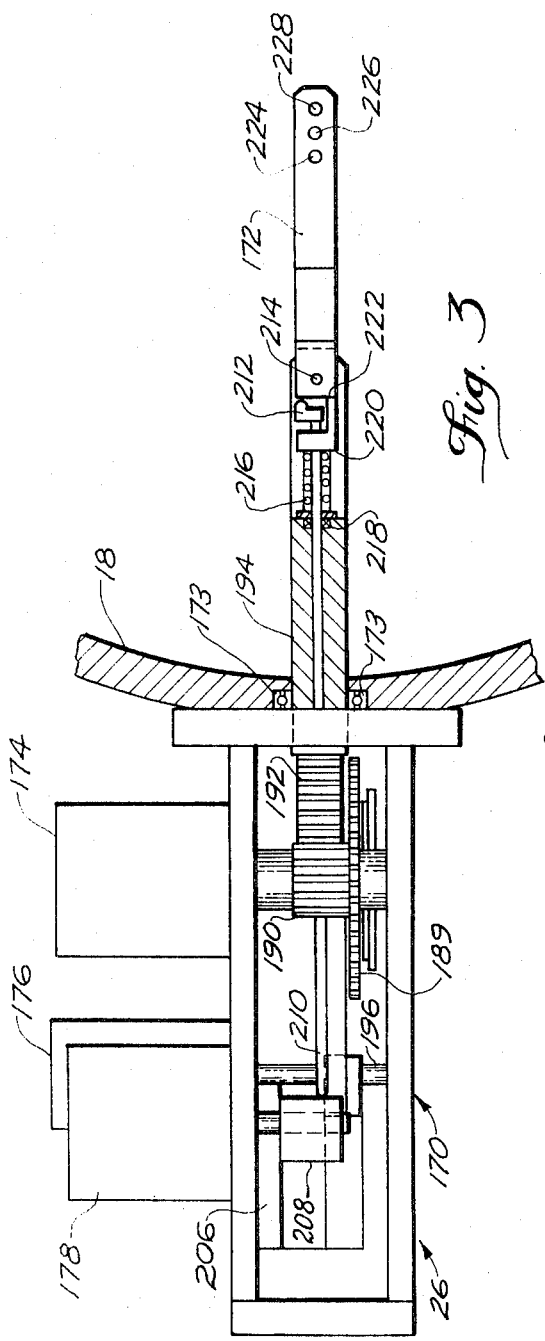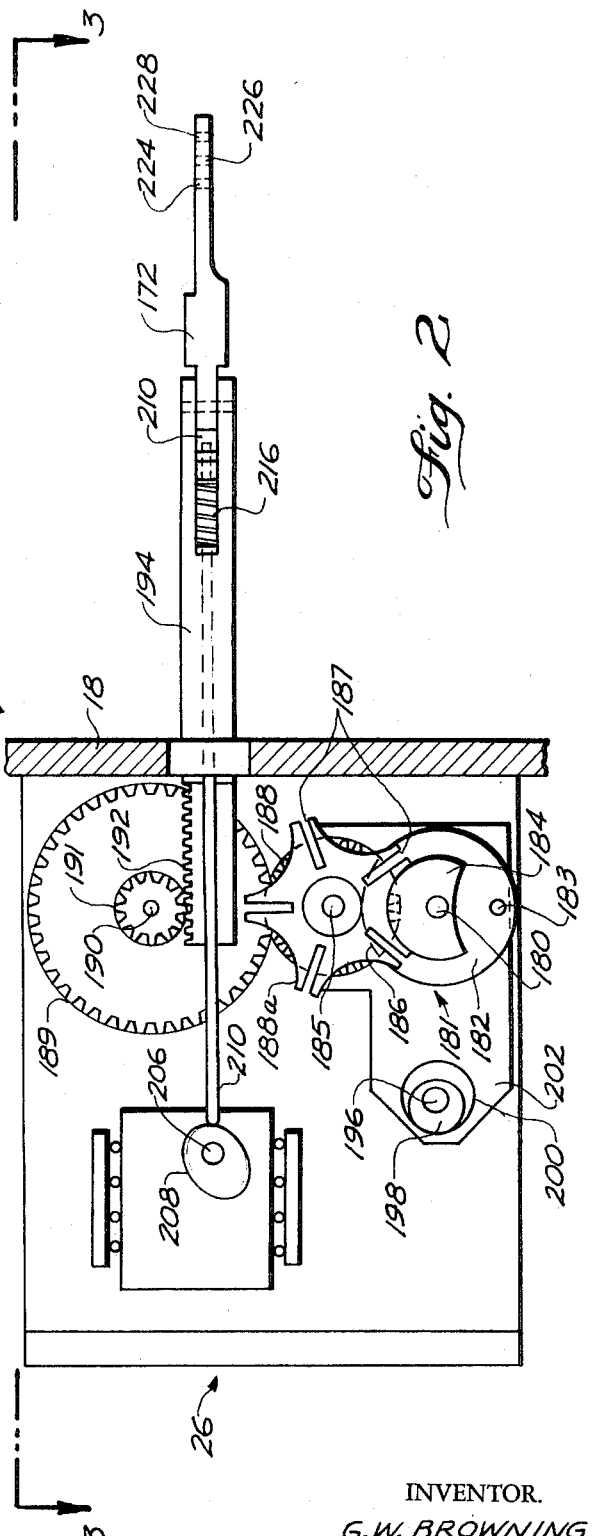

APERTURE PLATE CONTROL MECHANISM FOR ELECTRON MICROSCOPES

BACKGROUND OF THE INVENTION

This invention pertains to the art of electron microscopes, and more particularly, to an improved device for altering the beam of electrons which pass through a specimen or object to be viewed.

Electron microscopes have included various systems for varying the position of various elements within the microscope chamber from a position outside of the chamber. For example, drive motors have been coupled to specimen support rods for varying the position of the support rod to thereby vary the position of a specimen with respect to the electron beam. It is desirable that the control of elements within the microscope chamber be accomplished without a loss in the vacuum, which must be maintained in the microscope chamber during operation of the microscope.

Another of the elements within a microscope chamber that must frequently be varied in position is the aperture plate. This adjustment is necessary whenever it is desirable to change the size of the aperture, and also when it is desirable to change the position of the selected aperture plate with respect to the beam of electrons.

SUMMARY OF THE INVENTION

The present invention is directed toward an electron microscope having a control mechanism for varying the position of an aperture plate with respect to a beam of electrons without a loss of the vacuum within the microscope chamber, thereby overcoming the noted disadvantages, and others, of such previous electron microscopes.

In accordance with one aspect of the present invention, the electron microscope includes a microscope chamber having a source of electrons positioned within the chamber, focusing means for directing the electrons into a beam of electrons, means for directing the electrons toward an object to be irradiated, object-positioning means for positioning the object, an electron-stimulated device positioned within the chamber and having a target area positioned to intercept the electrons which pass through the object, and, an aperture device disposed between the object-positioning means and the electron-stimulated device. The aperture device includes an aperture support arm extending into the microscope chamber and mounted for movement along the longitudinal axis of the support arm, an aperture plate having at least one passage extending therethrough in a direction generally parallel to the direction of the beam of electrons, the aperture plate is pivotally mounted on the support arm, first drive means for varying the position of the support arm, first drive means for varying the position of the support arm, and second drive means for rotating the aperture plate with respect to the support arm to thereby vary the position of the aperture along two perpendicular axes.

In accordance with another aspect of the present invention the second drive means includes an elongated rod member supported by the support arm for movement in a longitudinal direction. One end of the rod member abuts at least a portion of the edge of the aperture plate so that when the rod member is moved in a direction toward the aperture plate the end of the rod member applies a force to the edge of the plate to thereby cause the plate to be rotated with respect to the support arm.

In accordance with another aspect of the present invention, the aperture plate has at least two passages extending therethrough in a direction generally parallel to the beam of electrons.

The primary object of the present invention is to provide an electron microscope having a control mechanism for varying the position of the aperture plate within the microscope chamber without a loss of vacuum within the chamber.

Another object of the present invention is to provide an electron microscope with a control mechanism for changing the size of the aperture through which the electron beam passes.

Another object of the present invention is to provide an electron microscope having a control mechanism for varying the position of the aperture plate along a pair of axes generally perpendicular to each other.

BRIEF DESCRIPTION OF THE DRAWINGS

These and other objects and advantages of the invention will become apparent from the following description of a preferred embodiment of the invention as read in connection with the accompanying drawings in which:

FIG. 2 is a sectional view illustrating in more detail the aperture mechanism as shown in FIG. 1; and, FIG. 3 is a sectional view of the aperture mechanism as illustrated in FIG. 2, taken along lines 3—3.

DESCRIPTION OF THE PREFERRED EMBODIMENT

Figure 1:
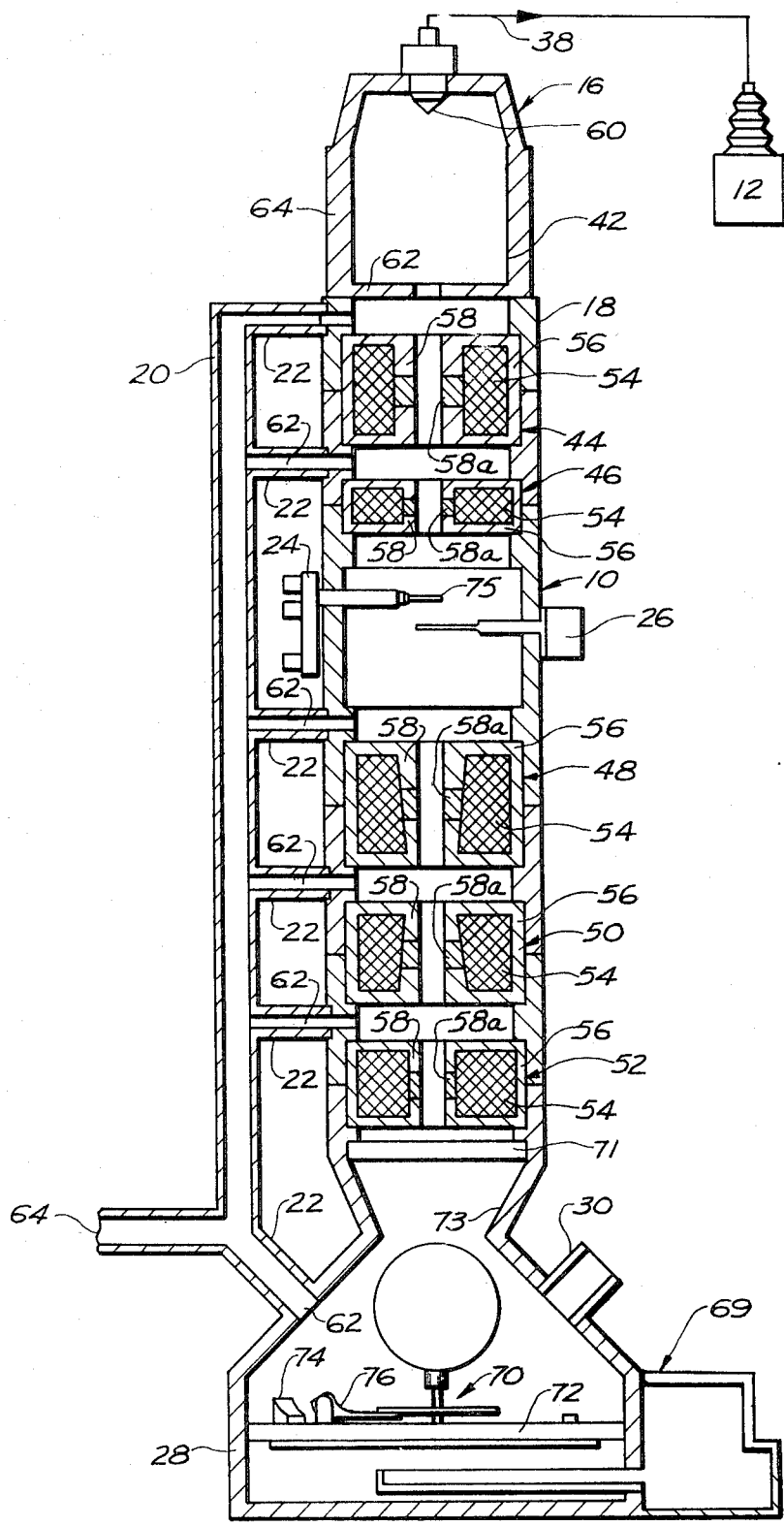
FIG. 1 is a sectional view illustrating the electron microscope of the present invention.

FIG. 1 generally illustrates an electron microscope 10 and generally includes an elongated housing member 18 having a cylindrical bore 42 extending therethrough and having an electron gun 16 positioned at one end thereof. A pair of condenser lens 44, 46, an objective lens 48, and a pair of projector lenses 50, 52 are respectively positioned within the bore 42 of housing member 18. Each of the lenses 44, 46, 48, 50, 52 generally include a magnetic winding 54, supported by a frame member 56 and positioned around a pole piece 58 for directing or focusing the flow of electrons through the microscope.

The electron gun 16 includes a filament 60 which is connected between ground and the high-voltage conductor 38 of power supply unit 12. Mounted on the housing 18 at a position between the condenser lens 46 and the objective lens 48 is the specimen-positioning mechanism 24 and the aperture control mechanism 26.

The vacuum manifold 20 communicates with passages 62 extending through the wall 64 of microscope housing 18 with a plurality of cylinders 22. Thus, the entire microscope housing 18 may be evacuated by applying a vacuum at the inlet 64 of mainfold 20.

Positioned in the lower portion, or viewing chamber 28 of microscope housing 18 is a screen mechanism 70 for viewing an image of the specimen 75 or object to be viewed. Screen mechanism 70 is generally comprised of a rotatable table 72 having a cammed surface 74 mounted thereon for driving a viewing plate support arm 76 to either a vertical position, an intermediate position, or a horizontal position.

A shutter mechanism 71 extends from wall 64 into the cylindrical bore 73 and is positioned beneath projector lens 52. The shutter mechanism, upon being opened, allows the passage of a beam of electrons generated at the electron gun 16. The electron beam passes through an object 75 and is focused by lenses 44, 46, 48, 50, 52. Upon closure of shutter mechanism 71, the beam of electrons is interrupted and prevented from passing into viewing chamber 28.

A film mechanism 69 is mounted on the viewing chamber 28 and extends into chamber 28 so that a film plate may be moved into a position to be exposed by the beam of electrons.

FIGS. 2 and 3 illustrate in more detail the aperture-positioning mechanism 26 as shown in FIG. 1, which generally comprises a housing member 170 mounted on the sidewall of microscope housing 18, an aperture support arm 194 extending from housing member 170 into the chamber of microscope housing 18, and an aperture plate 172 supported by and extending from the aperture support arm 194. An O-ring seal 173 is positioned between support arm 194 and the wall of the microscope housing 18 to maintain a vacuum within the microscope housing 18 while permitting relative movement between arm 194 and the microscope housing 18.

More particularly, the positioning mechanism 26 includes a "coarse" X-axis control motor 174, a "fine" X-axis control motor 176, and a Y-axis control motor 178. The "coarse" control motor 174 is connected by a shaft 180 through a Geneva mechanism 181 to affect a stepping movement of a shaft 185. The Geneva mechanism 181 is comprised of a disk-shaped drive member 182 mounted on the shaft 180. A pin 183 extends from the drive member 182 at an edge thereof and in a direction perpendicular to the drive member 182. Also mounted on the shaft 180 is an arcuate shaped member 184.

Shaft 185 carries a drive member 186 having five slots 187 extending inwardly from the edges toward the center thereof and having five concave portions 188a extending inwardly from the edges thereof and spaced between the slots 187. Thus, as the disk-shaped drive member 182 is rotated by the "coarse" control motor 174, the pin 183 engages successive ones of the slots 187 in the drive member 186 to thereby rotate the shaft 185 in a step by step manner. The arcuate member 184 retains the drive member 186 in a fixed position during the time required for pin 183 to move from one slot 187 to the next succeeding slot 187.

Also mounted on the shaft 185 is a gear 188 which in turn engages another gear 189 mounted on a shaft 190. Shaft 190 also carries another gear 191 having a smaller diameter than that of gear 189. The smaller diameter gear 191 engages a rack 192 which extends into and along the top portion of aperture support rod 194. Aperture support rod 194 is mounted on the aperture housing 170 for longitudinal movement. Thus, with each complete revolution of the "coarse" control motor 174, the gear 186 is indexed 72°, and in turn, through the gears 188, 189, and 191, engages the rack 192 for driving the aperture support arm 194 in either the left or right direction as viewed in FIGS. 2 and 3.

The fine control of the X-axis movement of aperture support arm 194 is controlled by the "fine" control motor 176 which drives a shaft 196 carrying an eccentric cam 198. Cam 198 is mounted within a cylindrical aperture 200 of a plate 202. The plate 202 is mounted for rotation about the shaft 185, so that as the cam 198 is rotated there is a change in the relative position between shaft 180 and shaft 185 thereby causing a slight rotation of gear 188. This slight rotation of gear 188 is reflected through gears 189, 191 to cause a slight change in the X-axis position of aperture support rod 194.

The Y-axis movement of aperture plate 172, i.e., movement in a vertical direction as viewed in FIG. 3, is controlled by the Y-axis control motor 178 which drives a shaft 206 carrying an eccentric cam 208. The cam 208 abuts an end of rod 210 so that as the cam is rotated, rod 210 is moved in either the left or right direction as viewed in FIGS. 2 and 3. The rod 210 extends through a channel in and is supported by the apparatus support arm 194. The movement of rod 210 is applied to aperture plate 172 through a projection 212 extending from the other end of rod 210. The aperture plate 172, being pivotally mounted on a pin 214 extending through the arm 194, is driven in a clockwise direction by the projection 212 extending from rod 210. Aperture plate 172 is returned to a central position and is moved in an upward direction, as viewed in FIG. 3, by a spring 216 which is retained at one end by a retaining block 218. Spring 216 biases a bracket 220, including a projection 222, against aperture plate 172. Thus, downward motion of aperture plate 172 is caused by rod 210 and the projection 212 being moved against aperture plate 172, and upward direction of aperture plate 172 is caused by the action of spring 216 against bracket 220 and the aperture plate 172. The aperture plate 172 has three apertures or passages 224, 226, 228, each of a different size, extending therethrough in a direction generally parallel to the direction of the beam of electrons projected from cathode 60.

Accordingly, a selected one of the three apertures 224, 226, 228 may be positioned in the beam of electrons by varying the X-axis position of plate 172. The apertures 224, 226, 228 may be moved along a Y-axis to position the selected aperture along that axis by the energization of drive motor 178.

Although the invention has been shown in connection with preferred embodiments, it will be readily apparent to those skilled in the art that various changes in form and arrangement of parts may be made to suit requirements without departing from the spirit and scope of the invention as defined by the appended claims.

We claim:

1. In an electron microscope comprising a microscope chamber having a source of electrons positioned within said chamber;

focusing means for directing said electrons into a beam of electrons;

means for directing said beam of electrons along a path toward a specimen to be examined a specimen stage for positioning a specimen in said beam path so that at least some of the electrons pass through the specimen an electron-stimulated device positioned within said chamber and having a target area positioned to intercept electrons which pass through a specimen being examined; and, an improved aperture assembly disposed along said beam path and comprising:

an aperture support arm extending into said chamber and being mounted for movement along the longitudinal axis of said support arm;

an aperture plate having at least one passage extending therethrough in a direction generally parallel to the direction of said beam path; said aperture plate being pivotably mounted on said support arm for movement in a plane perpendicular to said beam path first drive means for moving said support arm in a direction parallel to the longitudinal axis of said support arm to thereby vary the position of said aperture plate along a first axis; and second drive means including an elongated rod member mounted for movement in a direction parallel to the longitudinal axis of said support rod for applying a force to said aperture plate in order to rotate said aperture plate on said support arm to thereby vary the position of said aperture plate about a second axis being generally perpendicular to said first axis.

2. In an electron microscope comprising a microscope chamber having a source of electrons positioned within said chamber;

focusing means for directing said electrons into a beam of electrons;

means for directing said beam of electrons along a path toward a specimen to be examined;

a specimen stage for positioning a specimen in said beam path so that at least some of the electrons pass through the specimen;

an electron-stimulated device positioned within said chamber and having a target area positioned to intercept electrons which pass through a specimen being examined;

an improved aperture assembly disposed along said beam path and comprising:

an aperture support arm extending into said chamber and being mounted for movement along the longitudinal axis of said support arm;

an aperture plate having at least one passage extending therethrough in a direction generally parallel to the direction of said beam path; said aperture plate being pivotably mounted on said support arm for movement in a plane perpendicular to said beam path;

first drive means for moving said support arm in a direction parallel to the longitudinal axis of said support arm to thereby vary the position of said aperture plate along a first axis;

second drive means including an elongated rod member mounted for movement in a direction parallel to the longitudinal axis of said support rod for applying a force to said aperture plate in order to rotate said aperture plate on said support arm to thereby vary the position of said aperture plate about a second axis being generally perpendicular to said first axis; and, said second drive means including an elongated rod member supported by said support arm for movement in a longitudinal direction; one end of said rod member abutting at least a portion of the edge of said aperture plate so that when said rod member is moved in a direction toward said aperture plate said end of said rod member applies a force to said edge of said plate to thereby cause said plate to be rotated about an elongated axis of said pin member.

3. An apparatus as defined in claim 2 wherein said aperture plate has at least two passages extending therethrough in a direction generally parallel to said beam path.

4. An apparatus as defined in claim 2 including a cam member being mounted on a shaft for rotation about an axis generally perpendicular to the axis of said rod member and the other end of said rod member is positioned to ride on said cam member so that as said cam member is rotated about said shaft said rod member is driven in a longitudinal direction to thereby cause rotation of said aperture plate with respect to said support arm.

5. An apparatus as defined in claim 4 and wherein said shaft is coupled to an aperture control motor so that when said motor is energized said rod member is driven in a longitudinal direction thereby causing rotation of said aperture plate.

6. An apparatus as defined in claim 1 including a drive gear mounted on a shaft for rotation and at least a portion of said support arm defines a rack which engages said drive gear in a manner so that when said gear is rotated said support arm travels in a longitudinal direction.

7. An apparatus as defined in claim 6 wherein said first drive means includes indexing drive means for rotating said drive gear for a predetermined distance so that said support arm is indexed for a predetermined distance in a longitudinal direction.

8. An apparatus as defined in claim 7 wherein said first drive means includes an aperture control motor and said indexing drive means is a Geneva mechanism coupled between control motor and said drive gear.

9. An apparatus as defined in claim 2 including a drive gear mounted on a shaft for rotation and at least a portion of said support arm defines a rack which engages said drive gear in a manner so that when said gear is rotated said support arm travels in a longitudinal direction.

10. An apparatus as defined in claim 9 wherein said first drive means includes indexing drive means for rotating said drive gear for a predetermined distance so that said support arm is indexed for a predetermined distance in a longitudinal direction.

11. An apparatus as defined in claim 10 wherein said first drive means includes an aperture control motor and said indexing drive means is a Geneva mechanism coupled between the control motor and said drive gear.

12. In an electron microscope comprising a microscope chamber having a source of electrons positioned within said chamber;

focusing means for directing said electrons into a beam of electrons;

means for directing said beam of electrons along a path toward a specimen to be examined;

a specimen stage for positioning a specimen in said beam path so that at least some of the electrons pass through the specimen;

an electron-stimulated device positioned within said chamber and having a target area positioned to intercept electrons which pass through a specimen being examined;

an improved aperture assembly disposed along said beam path and comprising:

an aperture support arm extending into said chamber and being mounted for movement along the longitudinal axis of said support arm;

an aperture plate having at least one passage extending therethrough in a direction generally parallel to the direction of said beam path; said aperture plate being pivotably mounted on said support arm for movement in a plane perpendicular to said beam path;

first drive means for moving said support arm in a direction parallel to the longitudinal axis of said support arm to thereby vary the position of said aperture plate along a first axis; and, second drive means including an elongated rod member mounted for movement along an elongated axis for applying a force to an edge of said aperture plate to thereby cause said plate to rotate about a second axis being generally parallel to said beam path.

* * * * *